United States Patent
Takaya et al.

(10) Patent No.: US 9,527,471 B2
(45) Date of Patent: Dec. 27, 2016

(54) ACTUATOR

(71) Applicant: TOYODA GOSEI CO., LTD., Kiyosu-shi, Aichi-ken (JP)

(72) Inventors: Hisashi Takaya, Kiyosu (JP); Hajime Kitte, Kiyosu (JP); Kosuke Shigeta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/920,011

(22) Filed: Oct. 22, 2015

(65) Prior Publication Data
US 2016/0114759 A1    Apr. 28, 2016

(30) Foreign Application Priority Data

Oct. 24, 2014    (JP) .................. 2014-217637

(51) Int. Cl.
| | | |
|---|---|---|
| *C06D 5/00* | (2006.01) | |
| *B60R 21/38* | (2011.01) | |
| *B60R 21/00* | (2006.01) | |

(52) U.S. Cl.
CPC ........ *B60R 21/38* (2013.01); *B60R 2021/0004* (2013.01)

(58) Field of Classification Search
CPC ..................................... B60R 21/38
USPC .......................................... 102/530
See application file for complete search history.

(56) References Cited

FOREIGN PATENT DOCUMENTS

| EP | 1 493928 | * | 2/2004 |
| JP | 2011-208738 A | | 10/2011 |

* cited by examiner

*Primary Examiner* — Samir Abdosh
(74) *Attorney, Agent, or Firm* — Posz Law Group, PLC

(57) ABSTRACT

An actuator includes: a gas generator which generates an operation gas when actuated; an accommodation-side portion which accommodates and holds the gas generator; and a push-side portion which is pushed by the operation gas generated from the gas generator to advance relatively so as to move away from the accommodation-side portion, wherein: a seal material which realizes watertightness between the push-side portion and the accommodation-side portion before actuation is provided in an external surface side portion between the push-side portion and the accommodation-side portion by being poured and set through molding; and the seal material doubles as an adhesive which enables the push-side portion to move relatively when actuated and which provides a joining force with which the push-side portion can be restricted from moving relatively before actuation so as to join the push-side portion and the accommodation-side portion together.

4 Claims, 10 Drawing Sheets

ACTUATOR

CROSS-REFERENCE TO RELATED APPLICATION(S)

This application is based upon and claims the benefit of priority from Japanese Patent Application No. 2014-217637, filed on Oct. 24, 2014, the entire contents of which are incorporated herein by reference.

BACKGROUND

1. Field of the Invention

The present invention relates to an actuator which starts an operation of a device to which it is attached by generating an operation gas which is a combustion gas when activated and more particularly to, for example, an actuator which is preferably used for an onboard automotive safety apparatus such as a hood pop-up apparatus which lifts up a hood panel in receiving a pedestrian as a protection target.

2. Description of the Related Art

Some of conventional actuators like the one described above are used in a hood pop-up device which lifts up a hood panel, and those actuators are configured as a piston-cylinder type actuator which makes use of combustion gas generated as a result of ignition of explosive material when a gas generator is activated as operation gas (for example, refer to JP-A-2011-208738). In this actuator, the piston rod includes the piston portion which can slide within the cylinder and the rod portion which extends to the outside of the cylinder from the piston portion and which supports a hood panel as a receiving member which receives a pedestrian as a protection target in such a way as to raise the hood panel as high as a pedestrian receiving position. Further, due to the actuator being disposed in the hood panel, in this actuator, the packing is provided in the gap portion defined between near the distal end of the rod portion of the piston rod and the inner circumferential surface of the cylinder with a view to preventing the intrusion of rain water into the interior of the actuator. In case rain water arrives at the gas generator which supplies the operation gas to the piston portion side, the ignition fails when the gas generator is activated, and therefore, the provision of the packing is necessary with a view to ensuring the waterproofness of the actuator.

Further, in this actuator, the E ring is provided in the rod portion with a view to preventing the unintentional protrusion of the piston rod before actuation, that is, the unintentional extension of the actuator which is triggered by the forward movement of the piston rod before actuation. This E ring is brought into abutment with the ceiling wall portion of the cylinder to prevent the forward movement of the piston rod when in actuation while striking strongly the ceiling wall portion to be dislocated from the rod portion to allow the forward movement of the piston rod when the actuator is actuated.

In the conventional actuator, however, since the packing is provided, the packing has to be selected while considering the production tolerance in dimension, and the packing accommodation groove has to be designed accordingly. In addition, the E ring and the E ring accommodation groove also need to be provided, resulting in the problem that the actuator cannot be configured simple.

SUMMARY

The invention has been made to solve the problem, and an object thereof is to provide an actuator which can ensure the waterproofness and the prevention of the extension thereof before actuation with a simple and easy configuration, even in the event that a gas generator is used which generates operation gas when actuated.

According to an aspect of the invention, there is provided an actuator including: a gas generator which generates an operation gas when actuated; an accommodation-side portion which accommodates and holds the gas generator; and a push-side portion which is pushed by the operation gas generated from the gas generator to advance relatively so as to move away from the accommodation-side portion, wherein: a seal material which realizes watertightness between the push-side portion and the accommodation-side portion before actuation is provided in an external surface side portion between the push-side portion and the accommodation-side portion by being poured and set through molding; and the seal material doubles as an adhesive which enables the push-side portion to move relatively when actuated and which provides a joining force with which the push-side portion can be restricted from moving relatively before actuation so as to join the push-side portion and the accommodation-side portion together.

In the actuator according to the invention, since the seal material which doubles as the adhesive closes the gap (the seal portion) between the push-side portion and the accommodation-side portion, the intrusion of rain water into the gas generator can be prevented to thereby ensure the waterproofness of the actuator before actuation. In addition, before actuation, the seal material which doubles as the adhesive joins the push-side portion and the accommodation-side portion together at the seal portion, whereby the push-side portion can be restricted from advancing relative to the accommodation-side portion, and the extension of the actuator before actuation can be prevented. Additionally, since the seal material which doubles as the adhesive joins the push-side portion and the accommodation-side portion together with the joining force which enables the push-side portion to move relative to the accommodation-side portion when actuated, the push-side portion releases the adhesion to move smoothly relative to the accommodation-side portion at the time of actuation of the actuator where the operation gas is generated from the gas generator.

In the actuator according to the invention, the seal material which doubles as the adhesive is provided by being poured and set through molding, and the seal material can easily be provided by being poured to fill the seal portion which is disposed on the external surface of the actuator. Further, in the actuator according to the invention, although the mold and the filling machine are needed, the conventionally required labor-hours to design to provide the packing, the packing accommodation groove, the E ring and the E ring accommodation groove or to assemble them together are unnecessary, and therefore, the actuator can be formed in a simple and easy fashion.

Consequently, in the actuator according to the invention, although the configuration is adopted in which the gas generator is used which generates the operation gas when actuated, the waterproofness and the prevention of the extension of the actuator before actuation can be ensured in a simple and easy fashion.

In the actuator according to the invention, the accommodation-side portion may include an input member for inputting an operation signal for the gas generator which is provided to project from the accommodation-side portion to an exterior portion, and a seal material formed from the same material as that of the seal material may be provided by being poured and set in the portion of the accommodation-side portion where the input member projects.

In the configuration like this, in pouring the seal material to fill the gap defined between the push-side portion and the accommodation-side portion, the seal material can simultaneously be poured to fill the space around the circumference of the input member in the accommodation-side portion. Because of this, in the configuration like this, the stable waterproofness of the whole of the actuator including the waterproofness around the circumference of the input member can easily be ensured.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
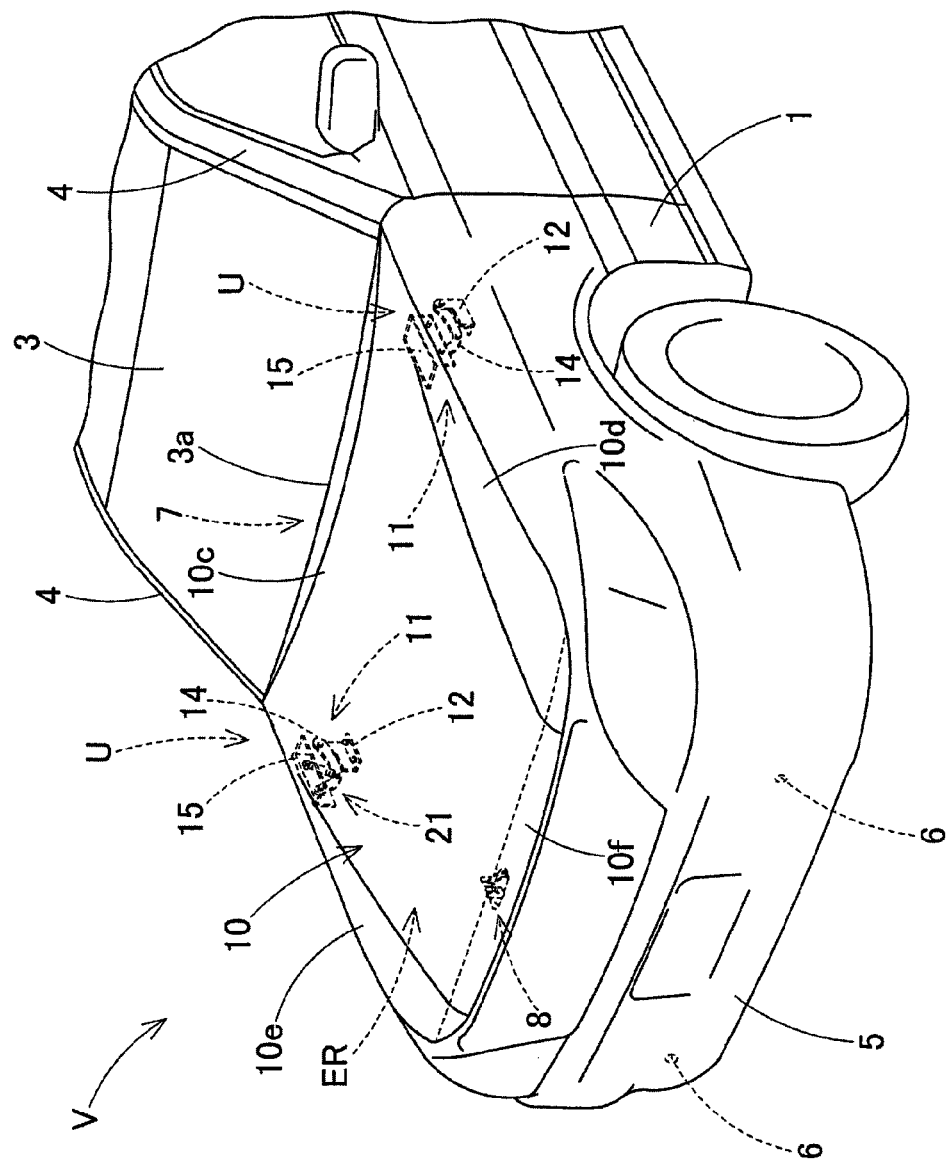
FIG. 1 is a schematic perspective view of a vehicle showing an onboard arrangement of hood pop-up apparatuses which use an actuator according to a first embodiment of the invention.
Figure 2:
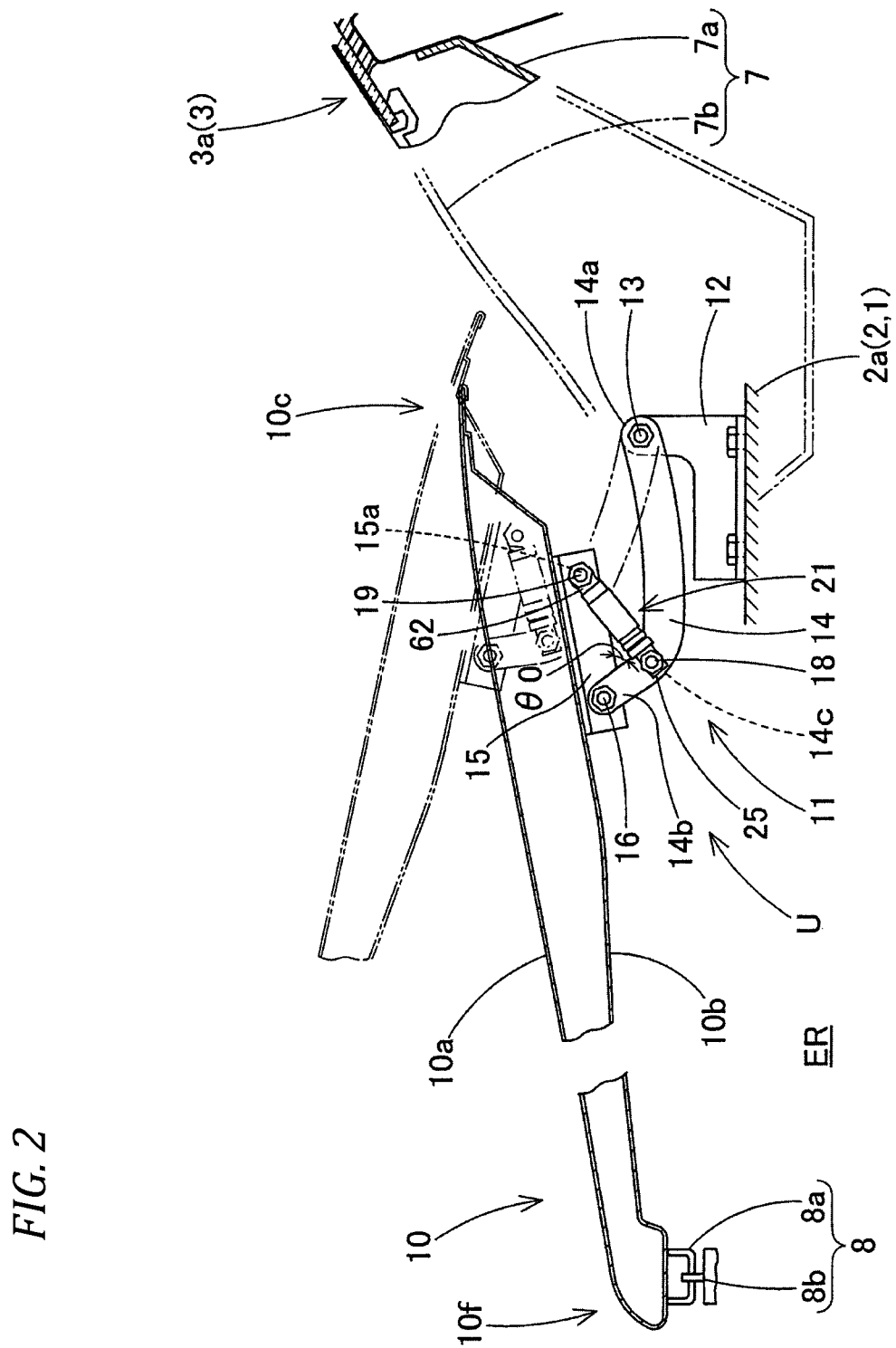
FIG. 2 is a schematic vertical sectional view of the vehicle on which the hood pop-up apparatus is mounted.
Figure 3:
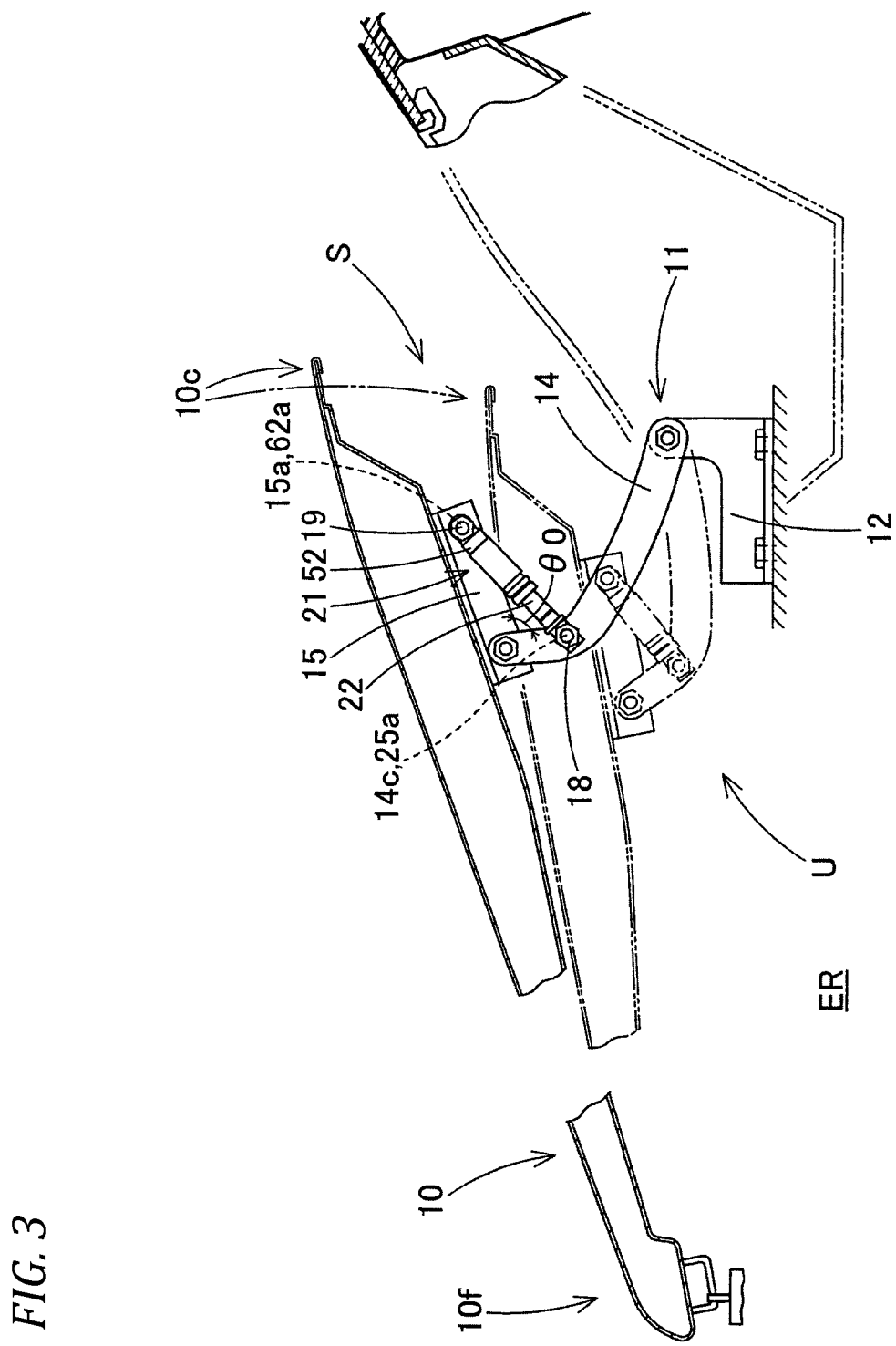
FIG. 3 is a schematic vertical sectional view of the vehicle showing the actuator of the first embodiment when in operation.

Hereinafter, an embodiment of the invention will be described based on drawings. As shown in FIGS. 1 to 3, an actuator 21 of a first embodiment is used in a hood pop-up apparatus (hereinafter, also referred to as a "pop-up apparatus" as required) U as an automotive safety apparatus and is provided in a hinge mechanism 11 near a rear end 10c of a hood panel 10 of a vehicle V.

In this specification, unless described otherwise, front-to-rear and up-to-down directions coincide with front-to-rear and up-to-down directions of the vehicle V (refer to FIG. 1), and a left-to-right direction coincides with a left-to-right direction of the vehicle V when looking at the front of the vehicle V from the inside thereof.

In the case of the first embodiment, sensors 6 are provided in a front bumper 5 of the vehicle V as shown in FIG. 1 to detect or predict a collision with a pedestrian, and signals from the sensors 6 are inputted into a control circuit, not shown. When the control unit detects a collision of the vehicle V with a pedestrian based on the signals from the sensors 6, the control unit activates the actuator 21 by igniting gunpowder, not shown, in a gas generator 70 in the actuator 21 to generate an operation gas G to thereby actuate the pop-up apparatus U (refer to FIGS. 3, 8).

As shown in FIGS. 1, 2, the hood panel 10 is provided so as to cover an engine compartment ER of the vehicle V from thereabove. The hood panel 10 is connected to a body 1 of the vehicle V so as to be opened and closed at a front thereof by the hinge mechanism 11 which are disposed near the rear end 10c on both left and right edges 10d, 10e. The hood panel 10 is made of a metallic panel of steel or aluminum alloy and is made up of an upper outer panel 10a and a lower inner panel 10b whose strength is enhanced higher than that of the outer panel 10a. The hood panel 10 can plastically be deformed so as to absorb the kinetic energy of a pedestrian when it receives the pedestrian. In this embodiment, on a collision of the vehicle V with a pedestrian, the actuators 21 are actuated to create a deformation space S between the rear end 10c of the raised hood panel 10 and the engine compartment ER as shown in FIG. 3, whereby an amount of plastic deformation when the hood panel 10 is bent to be deformed plastically can be increased, allowing the hood panel 10 to absorb greatly the kinetic energy of the pedestrian.

The hinge mechanisms 11 are provided near the rear end 10c on the left edge 10d and the right edge 10e of the hood panel 10. The hinge mechanisms 11 each include a hinge base 12 which is fixed to the body 1 in a position lying below the rear end 10c of the hood panel 10, a mounting plate 15 which is disposed on a lower surface side of the rear end 10c of the hood panel 10, and a hinge arm 14 which is pivoted on the hinge base 12 and the mounting plate 15. To describe in detail, the hinge base 12 is fixed to a mounting flange 2a which is connected to a hood ridge reinforcement 2 provided on the body 1. When the hood panel 10 is opened in a normal use, the hinge mechanism 11 is designed to be opened about a pivot portion near a proximal end 14a of the hinge arm 14 which lies at an end thereof which faces the hinge base 12 as a rotation center (refer to chain double-dashed lines in FIG. 2).

This hinge arm 14 is provided so as to extend forwards from the proximal end 14a to a distal end 14b. The proximal end 14a is connected to a rear end portion of the hinge base 12 by making use of a support shaft 13, and thus, the hinge arm 14 can rotate about the support shaft 13 as a rotation center. The distal end 14b is also connected to a front end portion of the mounting plate 15 by making use of a support shaft 16, and the hinge arm 14 can also rotate about the support shaft 16 as a rotation center. The left and right support shafts 13, 16 are provided so that their axial directions follow the left-to-right direction of the vehicle V. However, in the normal use, the actuator 21 which is connected to connecting portions 14c, 15a where the actuator 21 is connected to the hinge arm 14 and the mounting plate 15 is prevented from extension by means of a seal material 81 which doubles as an adhesive, which will be described later. Therefore, the hinge arm 14 does not rotate relative to the mounting plate 15. Because of this, when it is opened and closed in the normal use, the hood panel 10 is opened and closed about the portions where the support shafts 13 are provided as the rotation centers. Namely, when opening the hood panel 10, as shown by solid lines and the chain double-dashed lines in FIG. 2, a front end 10f side of the hood panel 10 is raised together with the distal end 14b sides of the hinge arms 14 about the left and right support shafts 13 as the rotation centers, whereby the hood panel 10 can be opened at the front thereof. Then, when the front end 10f side of the hood panel 10 is pressed down, the hood panel 10 rotates about the support shafts 13 as the rotation center to be closed.

The left and right hinge mechanisms 11 are provided laterally symmetrical, and both ends (connecting portions 25, 62) of the actuator 21 are connected to the connecting portions 14c, 15a, respectively, where the actuator 21 is connected to the hinge arm 14 and the mounting plate 15 on a side facing the engine compartment ER, The connecting portion 14c of the hinge arm 14 with the actuator 21 is disposed closer to the distal end 14b side than an intermediate portion between the proximal end 14a and the distal end 14b. The connecting portion 15a of the mounting plate 15 with the actuator 21 is disposed further rearwards than the support shaft 16.

A known hood lock mechanism 8 is provided on the front end 10f side of the hood panel 10. The hood lock mechanism 8 includes a lock striker 8a which is fixed to a lower surface of the front end 10f of the hood panel 10 and latch 8b which is provided on the body 1 side to lock the striker 8a. The latch 8b is designed not to release the locking of the lock striker 8a until a lever, not shown, is operated. Thus, even when the rear end 10c of the hood panel 10 is raised, the front end 10f of the hood panel 10 is prevented from being raised apart from the body 1 by the latch 8b which locks the lock striker 8a.

Further, as shown in FIGS. 2, 3, a cowl 7 is provided at the rear of the hood panel 10, and this cowl 7 is made up of a highly rigid cowl panel 7a which belongs to the body 1 and a cowl louvered panel 7b of synthetic resin which is situated above the cowl panel 7a. The cowl louvered panel 7b is provided so as to continuously connect to a lower portion 3a of a front windshield 3 at a rear end portion thereof. As shown in FIG. 1, front pillars 4, 4 are provided at the left and right of the front windshield 3.

Figure 4:
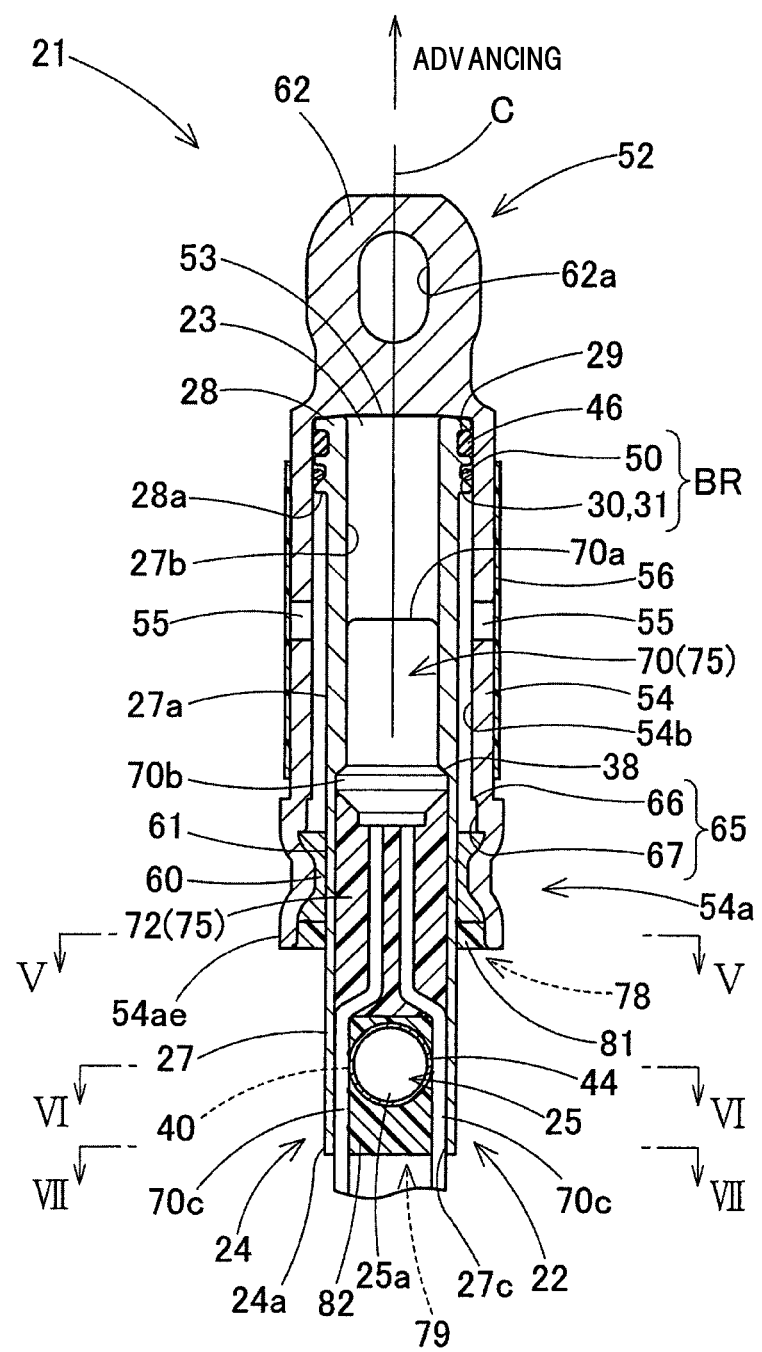
FIG. 4 is a vertical sectional view the actuator of the first embodiment.
Figure 8:
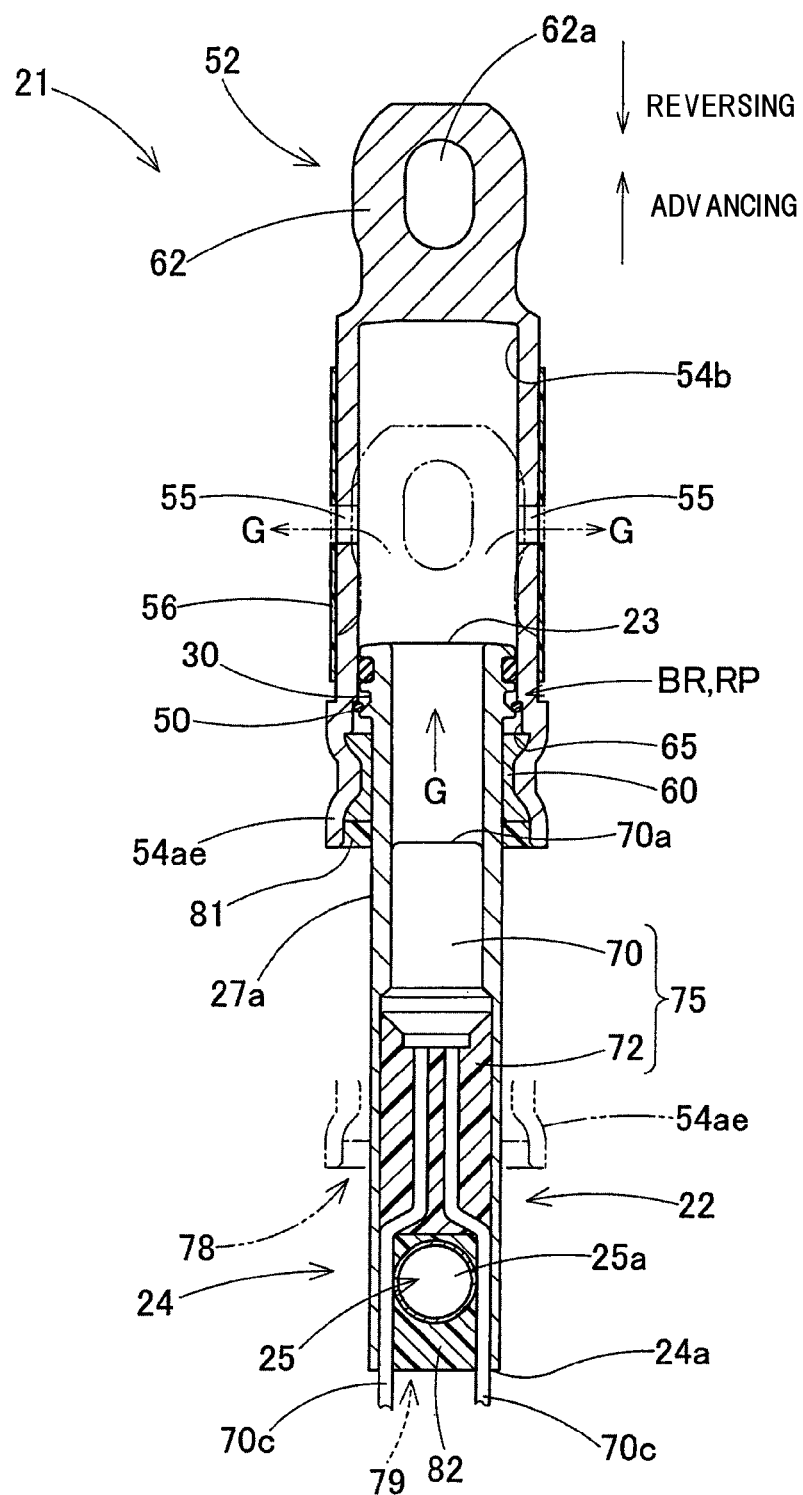
FIG. 8 is a vertical sectional view showing the actuator of the first embodiment when in operation.

As shown in FIGS. 4, 8, the actuator 21 of the first embodiment includes a gas generator 70 which generates an operation gas G when the actuator 21 is actuated, an accommodation-side portion 22 which accommodates the gas generator 70 to hold it and a push-side portion (also, referred to as a moving-side portion) 52 which is pushed by the operation gas G which is generated from the gas generator 70 to move forwards relatively so as to move away from the accommodation-side portion 22 to thereby push the actuator 21 to extend. In the first embodiment, when the actuator 21 is actuated, the gas generator 70 generates the operation gas G, whereupon the push-side portion 52 advances obliquely upwards and rearwards relative to the accommodation-side portion 22 to extend (refer to FIGS. 2, 3) to thereby cause the connecting portions 14c, 15a with the hinge arm 14 and the mounting plate 15 to move away from each other. Then, as this occurs, an intersecting angle θ0 between the hinge arm 14 and the mounting plate 15 is increased, and the hood panel 10 is raised at the rear end 10c while the front end 10f which is locked by the latch 8b is prevented from being raised.

The gas generator 70 uses a squib or a micro gas generator which ignites predetermined gunpowder, not shown, to thereby generate operation gas G by means of combustion of the gunpowder itself or combustion of a gas generating agent which is ignited by the gunpowder when actuated. Lead wires 70c, which are input members through which an ignition signal (an operation signal) is inputted from the control circuit, not shown, are connected to a proximal portion side of the generator 70 which lies away from a distal end 70a from which the operation gas G is discharged.

When an ignition signal is inputted thereinto from the control circuit, not shown, the gas generator 70 ignites the gunpowder incorporated therein for combustion and further also causes the gas generating agent to burn as required so as to generate combustion gas. Then, the combustion gas is discharged from the distal end 70a as the operation gas G to be supplied to a ceiling wall portion 53 of the push-side portion 52. Additionally, in the case of the first embodiment, the gas generator 70 is configured as an assembly 75 which is formed integrally with a resin portion 72 of synthetic resin such as polyamide in such a way as to be accommodated within an inner case 27 of the accommodation-side portion 22 with the lead wires 70c left projecting and is accommodated in the inner case 27 as the assembly 75. Further, in the first embodiment, an opening 27c at a proximal end side of the lead wires 70c which project from the inner case 27 is filled with a seal material 82 which is made from the same material as that of the seal member 81 so as to close the circumferences of the lead wires 70c, thereby the waterproofness being ensured.

Figure 6:
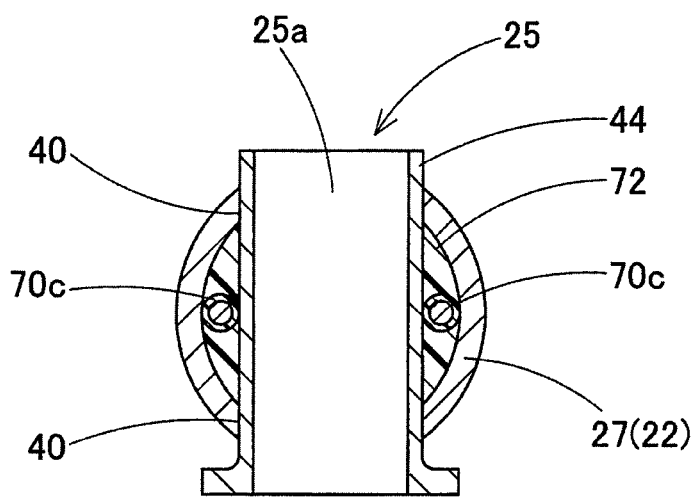
FIG. 6 is a cross-sectional view of the actuator of the first embodiment, taken along a line VI-VI in FIG. 4.

The assembly 75 is inserted from the opening 27c at a proximal end 24a of the inner case 27 (the accommodation-side portion 22) so that a collar portion 70b of the gas generator 70 is brought into abutment with a step 38, which will be described later, of the inner case 27. The assembly 75 is prevented from being dislocated from the inner case 27 by a substantially annular retainer 44 and is accommodated to be held in the accommodation-side portion 22 (the inner case 27). As shown in FIGS. 4, 6, the retainer 44 is fitted in an assembling hole 40 opened in the inner case 27 to be fixed in place therein. The seal material 82 is filled in the opening 27c through molding after the retainer 44 is fitted in the assembling hole 40 and is then left set up to stay therein.

The accommodation-side portion 22 of the actuator 21 is formed of the substantially cylindrical metallic inner case (the cylindrical member) 27 which is made of steel. The accommodation-side portion 22 includes an open end 23 which is opened circularly at a distal end side (an upper end side shown in FIGS. 4, 8) for discharging the operation gas G and the gas generator 70 which is provided at a proximal portion 24 side which lies away from the open end 23, and the proximal end 24a side is connected to the hinge arm 14. The connecting portion 25 which is connected to the hinge arm 14 includes a connecting hole portion 25a. Thus, the actuator 21 is connected rotatably to the connecting portion 14c of the hinge arm 14 by making use of a pivot device (a pivot pin) 18 which is inserted through the connecting hole portion 25a. The pivot device 18 penetrates the connecting hole portion 25a to be connected rotatably to the connecting portion 14c of the hinge arm 14. In the case of the first embodiment, the connecting hole portion 25a makes use of an inner circumferential through hole of the retainer 44 which is fixed in the assembling hole 40 of the inner case 27 for accommodating to hold (for restricting the dislocation of) the assembly 75.

The inner case 27 which makes up the accommodation-side portion 22 includes a flange portion 28 which projects at a distal end (the open end 23) side of an outer circumferential surface 27a and the step 38 which is provided on an inner circumferential surface 27b on the proximal portion 24 side so as to narrow its bore diameter towards the open end 23 side. As has been described before, the collar portion 70b of the gas generator 70 which is covered by the resin portion 72 is brought into abutment with the step 38.

Figure 9:
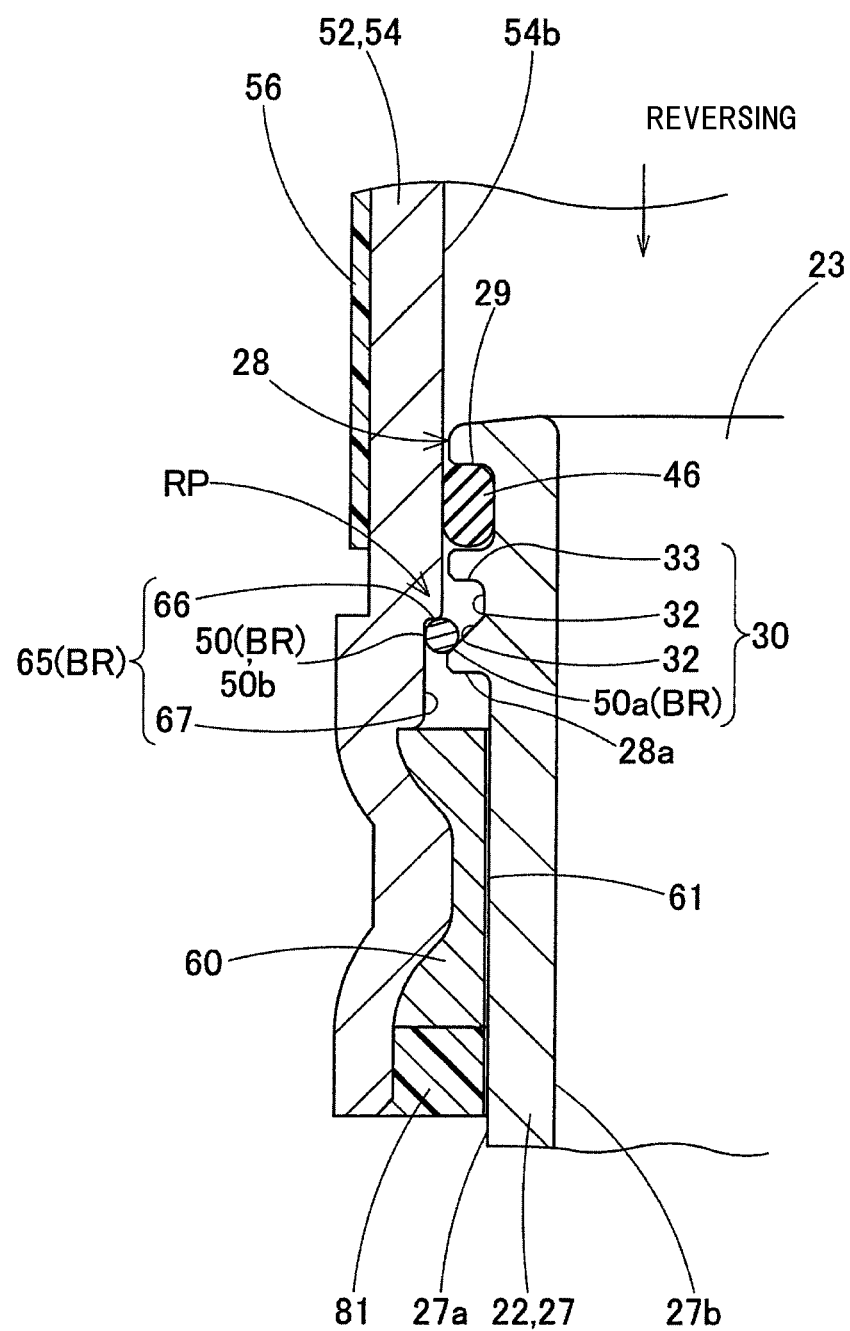
FIG. 9 is a partially enlarged vertical sectional view of the actuator of the first embodiment showing the vicinity of a lock ring after actuation.

As shown in FIGS. 4, 9, an annular grove 29 and an accommodation groove 30 are provided on an outer circumferential surface of the flange portion 28 sequentially in that order from a distal end side. An annular seal material (a packing, an O ring) 46 of rubber is fitted in the annular groove 29 so as to ensure the gas sealing properties of the push-side portion 52 when it advances.

A lock ring 50 is accommodated in the accommodation groove 30. The lock ring 50 makes up a reverse preventing lock mechanism BR for preventing the reverse of the push-side portion 52 when actuation of the actuator 21 is completed. The lock ring 50 is made up of a C ring of spring steel having a circular cross section and adapted to be elastically deformed. The accommodation groove 30 includes a bottom surface 32, a step surface 33 on a side of the bottom surface 32 which faces the annular groove 29 and an inclined tapered restricting surface 31 on a side of the bottom surface 32 which lies away from the step surface 33.

A step surface of the flange portion 28 which projects from the outer circumferential surface 27a acts as a restricting surface 28a for restricting the dislocation of the push-side portion 52 which stops a distal end portion 54a side of the push-side portion 52 when the actuator 21 is actuated to operate, restricting a maximum extension (a maximum operation stroke) of the actuator 21. Because of this, the flange portion 28 functions as a stopper when the push-side portion 52 advances.

Additionally, as has been described before, the assembling hole 40 which is at right angles to an axis C of the actuator 21 is formed in the inner case 27 on the proximal end 24a side thereof so that the retainer 44 can be fitted to be fixed therein.

The push-side portion (the moving side portion) 52 of the actuator 21 is made of metal such as steel and includes the ceiling wall portion 53 which covers the open end 23 side of the accommodation-side portion 22 and a substantially cylindrical circumferential wall portion 54 which extends towards the reverse side of the push-side portion 52, that is, downwards in FIGS. 4, 8 so as to cover an outer circumference of the accommodation-side portion 22 from an outer circumferential edge of the ceiling wall portion 53 to at least the proximal portion 24 side where the gas generator 70 is disposed.

A connecting portion 62 is provided on an upper surface side of the ceiling wall portion 53 which lies away from the open end 23, and this connecting portion 62 has a round hole-like connecting hole portion 62a via which the connecting portion 62 is connected to the mounting plate 15. This connecting portion 62 is connected rotatably to the connecting portion 15a of the mounting plate 15 by making use of a pivot device (a pivot pin) 19 which is inserted through the connecting hole portion 62a. The pivot device 19 penetrates the connecting hole portion 62a to be connected rotatably to the connecting portion 15a of the mounting plate 15.

The circumferential wall portion 54 is configured into a smooth circular arc-like surface which is concentric with an axis C of the actuator 21 (that is, a traveling center axis C of the push-side portion 52) so as to advance while ensuring the gas sealing properties with an inner circumferential surface 54b extending to a locking step portion 65 which is provided on the inner circumferential surface at a distal end portion 54a which lies away from the ceiling wall portion 53 made slidable on the seal material 46 retained on the outer circumferential surface of the accommodation-side portion 22.

The locking step portion 65 makes up the reverse preventing lock mechanism BR together with the lock ring 50 and the tapered restricting surface 31 of the accommodation groove 30. The locking step portion 65 includes an outer circumferential restricting surface 67 which is an arc-shaped surface parallel to the axis C, constituting a bottom surface of the locking step portion 65 and a locking restricting surface 66 which reduces its bore diameter from an edge at an advancing side of the outer circumferential restricting surface 67 towards the advancing side to thereby be formed into a tapered surface which continuously connects to the inner circumferential surface 54b (refer to FIG. 9).

The reverse preventing lock mechanism BR will be described. In the first embodiment, before the actuator 21 is actuated, the lock ring 50 is accommodated in the accommodation groove 30 while being narrowed diametrically as a result of the contact with the inner circumferential surface 54b of the push-side portion 52 or while being allowed to expand (refer to FIG. 4). Then, when the push-side portion 52 advances completely, the lock ring 50 expands diametrically and is accommodated in the locking step portion 65 of the push-side portion 52, as shown in FIGS. 8, 9. The lock ring 50 is set so that a cross-sectional diametric dimension is larger than a width dimension of the locking restricting surface 66 of the locking step portion 65 (a width dimension between the outer circumferential restricting surface 67 and the inner circumferential surface 54b) and a dimension half the diametric dimension (a radial dimension) is substantially equal to or slightly smaller than the width dimension of the locking restricting surface 66. Because of this, when the lock ring 50 is accommodated in the locking step portion 65, the lock ring 50 strikes the outer circumferential restricting surface 67 of the locking step portion 65, and the lock ring 50 (an inner circumferential portion 50a) projects from the inner circumferential surface 54b of the push-side portion 52. Additionally, when the push-side portion 52 attempts to reverse after its advancement has completed with the lock ring 50 accommodated in the locking step portion 65, even though the locking restricting surface 66 of the push-side portion 52 strikes the lock ring 50, the lock ring 50 strikes the tapered restricting surface 31, staying stationary, and the lock ring 50 is locked between the locking restricting surface 66 and the tapered restricting surface 31 (refer to FIG. 9).

As a result, even though the push-side portion 52 attempts to reverse after its advancement has completed, when the push-side portion 52 is in a lock position RP, the tapered restricting surface 31 of the accommodation-side portion 22 strikes the inner circumferential portion 50a of the lock ring 50 which is accommodated in the locking step portion 65 and an outer circumferential portion 50b of the lock ring 50 is prevented from expansion by the outer circumferential restricting surface 67. In this state, since the lock ring 50 is locked so as not to be dislocated from the locking restricting surface 66, the reverse of the push-side portion 52 is prevented. Consequently, in the case of the first embodiment, the reverse preventing lock mechanism BR for preventing the reverse of the push-side portion 52 after its advancement has completed is made up of the locking step portion 65 on the push-side portion 52 which includes the locking restricting surface 66 and the outer circumferential restricting surface 67, the lock ring (the reverse restricting member) 50 which is accommodated in the accommodation groove 30 on the accommodation-side portion 22 while being biased to expand diametrically, and the tapered restricting surface 31 of the accommodation groove 30 of the accommodation-side portion 22.

Additionally, a ring holder 60 is provided at an end edge 54ae side of the distal end portion 54a of the circumferential wall portion 54. The ring holder 60 is a substantially cylindrical member made of metal such as steel and is clamped to be fixed to an inner circumferential side of the distal end portion 54a of the circumferential wall portion 54. An inner circumferential surface 61 of the ring holder 60 is formed into a smooth circular arc-shaped surface which is concentric with the axis C. The ring holder 60 is set so as to be brought into abutment with the flange portion 28, which acts as a stopper of the accommodation-side portion 22, when the push-side portion 52 has advanced completely. The inner circumferential surface 61 can slide on the outer circumferential surface 27a of the accommodation-side portion 22 and guides the advancement of the push-side portion 52 along the axis C.

Further, a plurality of exhaust ports 55, which penetrate the circumferential wall portion 54 from the outer circumference to the inner circumference, are formed near a central portion between the ceiling wall portion 53 and the end edge 54ae of the circumferential wall portion 54. A cover 56, which is made up of a heat-shrinkable film, is placed on an outer circumferential side of the circumferential wall portion 54 so as to cover the exhaust ports 55. The exhaust ports 55 are provided to discharge extra operation gas G therethrough and are opened in a position where the open end 23 of the accommodation-side portion 22 is surpassed to discharge the operation gas G therethrough when the actuator 21 is actuated to operate. When the operation gas G is discharged, the cover 56 is dislocated from the exhaust ports 55 or is fractured by means of the heat and pressure of the operation gas G.

A seal material 81 is filled in a gap (a seal portion) 78 which is opened between an inner circumferential side of the end edge 54ae of the push-side portion 52 and an outer circumferential side of the proximal portion 24 of the accommodation-side portion 22, in other words, the seal portion 78 on an external surface side between the push-side portion 52 and the accommodation-side portion 22 before the actuator 21 is actuated to operate. The seal material 81 is so provided by being filled and set through molding. The joining force between the push-side portion 52 and the accommodation-side portion 22 at the seal material 81 can resist sufficiently a moment applied when the hood panel 10 is opened and closed in the normal use by which the connecting portions 14c, 15a of the hinge arm 14 and the mounting plate 15 are caused to move away from each other and is set so that the end edge 54ae of the push-side portion 52 can be dislocated from the outer circumferential surface 27a near the opening 27c of the accommodation-side portion 22, that is, so that the push-side portion 52 can advance when the gas generator 70 is actuated to operate.

In the case of the first embodiment, a hot melt adhesive formed from a polyester resin of a melting temperature of 200 to 260° C. and a injection pressure of 10 to 20 Mpa (an adhesive marketed under a product name of "VYLOSHOT: GM-960" by TOYOBO CO., LTD.) is used as the seal material 81.

Figure 5:
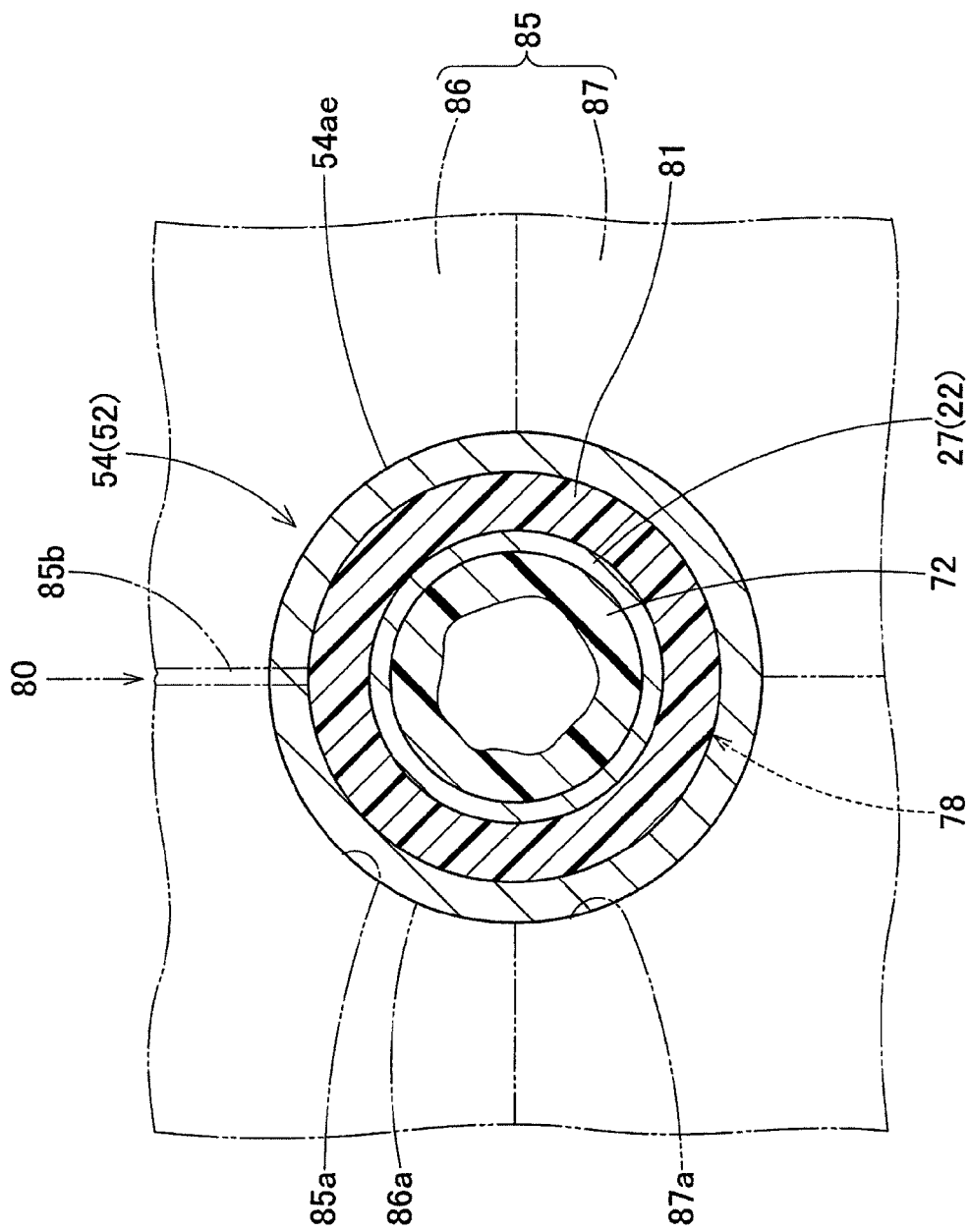
FIG. 5 is a cross-sectional view of the actuator of the first embodiment, taken along a line V-V in FIG. 4.

As indicated by chain double-dashed lines in FIG. 5, the seal member 81 is formed by the use of an injection molding mold 85 which is made up of a pair of split mold halves 86, 87. The split mold halves 86, 87 include mold surfaces 86a, 87a which define a cavity 85 for the seal portion 78 and which support the end edge 54ae and the inner case 27. A gate 85b is formed in the split mold half 86 for pouring a molten filler (a hot melt adhesive) 80 for forming the seal material 81 into the cavity 85a.

Figure 7:
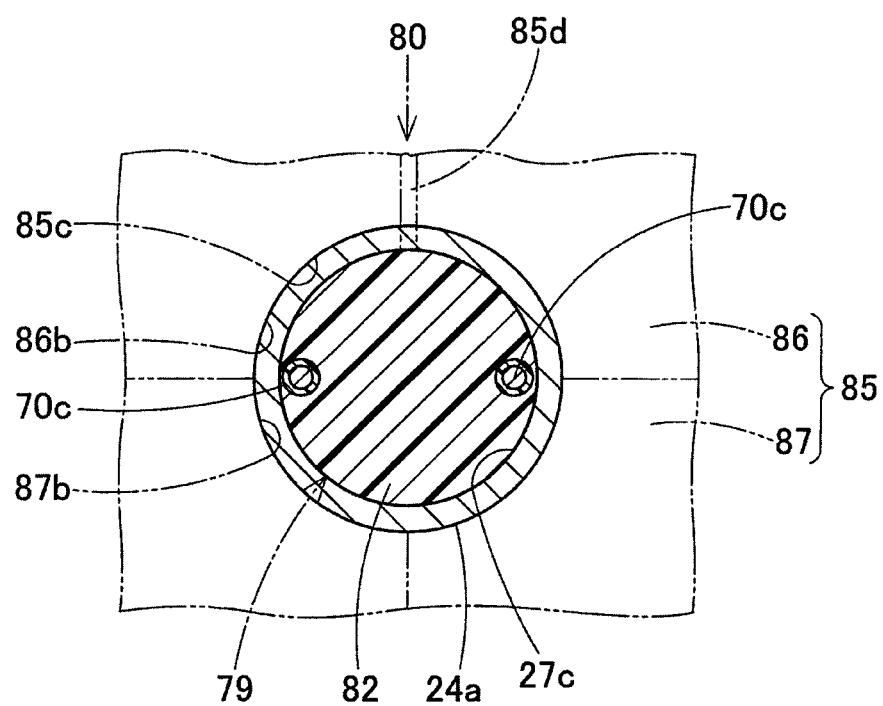
FIG. 7 is a cross-sectional view of the actuator of the first embodiment, taken along a line VII-VII in FIG. 4.

In the case of the first embodiment, as indicted by chain double-dashed lines in FIG. 7, the mold 85 includes a cavity 85c into which the filler 80 can be poured also at a seal portion 79 which surrounds the circumferences of the lead wires 70c in the opening 27c of the accommodation-side portion 22. Because of this, in the split mold halves 86, 87, corresponding mold surfaces 86b, 87b and a gate 85d are formed.

In molding, the actuator 21 to which all the constituent parts excluding the seal materials 81, 82 are assembled is set in the open mold 85. Then, after the mold 85 is closed, the filler 80 is poured to fill the cavities 85a, 85c through the gates 85b, 85d and is then cooled to be set. Then, the mold is released to open, whereby the actuator 21 with the seal materials 81, 82 can be fabricated.

It is noted that other hot melt adhesives or rubber materials may be used as long as they can be used as a seal material which doubles as an adhesive while ensuring a predetermined connecting or joining force. However, it is desired that those replacement materials can be formed at a melting temperature at which the gunpowder in the gas generator 70 is not ignited and at a pouring or injecting pressure at which no damage is made to the gas generator 70. Therefore, it is desirable to use a filler which can be formed at a melting temperature of 250° C. or lower and a pouring or injecting pressure of the order of 25 Mpa or lower.

The seal materials 81, 82 can ensure the waterproofness and can prevent the intrusion of dust into the actuator 21.

In the actuator 21 which is fabricated as described heretofore, the lead wires 70c, 70c are connected to the control circuit, not shown, and connecting portions 25, 62 are connected to the connecting portions (the connecting locations) 14c, 15a of the hinge arm 14 and the mounting plate 15 of each of the left and right hinge mechanisms 11 on the hood panel 10 by making use of the pivot devices 18, 19, whereby the actuators 21 can be provided in the hinge mechanism 11, and the pop-up apparatuses U can be mounted on the vehicle V.

In the pop-up apparatus U of the first embodiment which is mounted on the vehicle V, in the event that the actuator 21 is actuated to operate, the operation gas G is generated by the gas generator 70, the seal material 81 is separated from the accommodation-side portion 22 as indicated by the chain double-dashed lines and the solid lines in FIG. 3 or as shown in FIGS. 4 to 8, by means of a pressure of the operation gas G, and the push-side portion 52 of the actuator 21 moves away from the accommodation-side portion 22, whereby the actuator 21 is allowed to extend. Then, the actuator 21 which is extending widens the intersection angle θ0 between the mounting plate 15 and the hinge plate 14, which raises the hood panel 10 at the rear end 10c thereof, whereby the hood panel 10 can ensure a wide deformation space S so that the hood panel 10 can be deformed largely and can receive a pedestrian while mitigating an impact.

In the case of the first embodiment, the operation stroke of the actuator 21 is about 40 mm, and the rear end 10c of the hood panel 10 can be raised about 80 mm.

Additionally, when the push-side portion 52 advances so that the exhaust ports 55 pass the flange portion 28 of the accommodation-side portion 22, the operation gas G moves the cover 56 closing the exhaust ports 55 or pushes the cover 56 to open (or to melt) partially the cover 56, whereby extra operation gag G is discharged from the exhaust ports 55.

In the actuator 21 of the first embodiment, before the actuator 21 is actuated to operate, the seal material 81 which doubles as the adhesive closes the gap (the seal potion) 78 between the push-side portion 52 and the accommodation-side portion 22, and therefore, the intrusion of rain water into the gas generator 70 can be prevented, whereby the waterproofness of the actuator 21 is ensured. Additionally, before the actuator 21 is actuated to operate, the seal material 81 which doubles as the adhesive join the push-side portion 52 and the accommodation-side portion 22 together at the seal portion 78, whereby the relative advancement of the push-side portion 52 to the accommodation-side portion 22 can be restricted, and the extension of the actuator 21 can be prevented before the actuator 21 is actuated to operate. In addition, the seal material 81 which doubles as the adhesive joins the push-side portion 52 and the accommodation-side portion 22 together with the joining force which enables the push-side portion 52 to advance relatively when the actuator 21 is actuated to operate. Therefore, when the actuator 21 is actuated to operate with the operation gas G generated from the gas generator 70, the push-side portion 52 releases the adhesion to the accommodation-side portion 22 and can move smoothly relative to the accommodation-side portion 22.

In the actuator 21 of the first embodiment, the seal material 81 which doubles as the adhesive is filled to be set through molding, and the seal material (the filler) 80 can easily be filled in the seal portion 78 which is disposed on the external surface side of the actuator 21 for provision therein. Further, in the actuator 21 of the first embodiment, although a filling machine (an injection machine) to fill the filler 80 in the mold 85 and the cavities 85a, 85c is necessary, the conventionally required labor-hours to design to provide the packing, the packing accommodation groove, the E ring and the E ring accommodation groove or to assemble them together are unnecessary, and therefore, the actuator 21 can be formed in a simple and easy fashion.

Consequently, in the actuator 21 of the first embodiment, although the gas generator 70 is used which generates the operation gas G when it is actuated, both the waterproofness and the prevention of the extension of the gas generator 70 before actuation can be ensured.

In the actuator 21 of the first embodiment, the accommodation-side portion 22 is configured so that the lead wires 70c, 70c, which are the input members for inputting the operation signal of the gas generator 70, are left projecting to the exterior portion from the opening 27c of the inner case 27. However, a seal material 82, which is made up of the filler 80 as with the seal material 81, is filled and set also in the portion where the lead wires 70c, 70c of the accommodation-side portion 22 are caused to project so as to be set therein.

Because of this, in the first embodiment, in filling the seal material 81 in the gap (the seal portion) 78 between the push-side portion 52 and the accommodation-side portion 22, the seal material 82 can be filled simultaneously around the circumference (the seal portion) 79 of the input members of the accommodation-side portion 22. As a result, in the configuration like this, the stable waterproofness of the whole of the actuator 21 including the waterproofness around the lead wires 70c, 70c can easily be ensured.

In the first embodiment, while the connecting portion 25 of the accommodation-side portion 22 of the actuator 21 is connected to the hinge arm 14 and the connecting portion 62 of the push-side portion 52 is connected to the mounting plate 15, a reverse configuration may be provided in which the connecting portion 25 of the accommodation-side portion 22 is connected to the connecting portion 15a of the mounting plate 15, and the connecting portion 62 of the push-side portion 52 is connected to the connecting portion 14c of the hinge arm 14.

Next, an actuator 121 of a second embodiment shown in FIGS. 10, 11 will be described. As with the actuator 21 of the first embodiment, the actuator 121 of the second embodiment is used for a hood pop-up apparatus U in such a way as to connect a hinge arm 14 and a mounting plate 15 together of a hinge mechanism 11.

However, in the second embodiment, the actuator 121 is of a cylinder type, and an accommodation-side portion 122 includes a bottom wall portion 127 which accommodates and holds a gas generator 185, a ceiling wall portion 123 which is provided so as to face the bottom wall portion 127, and a cylindrical circumferential wall portion 126 which extends from an outer circumferential edge of the bottom wall portion 127 to the ceiling wall portion 123. A piston portion 153 of a push-side portion (a movable-side portion) 152 is made to slide on an inner circumferential surface 126a of the circumferential wall portion 126.

The push-side portion (the movable-side portion) 152 is configured as a piston rod having the piston portion 153 which slides on the inner circumferential surface 126a of the circumferential wall portion 126 and a rod portion 155 which extends from the piston portion 153 to project from an insertion hole 124 of the ceiling wall portion 123.

The piston rod (the push-side portion) 152 has an accommodation recess portion which accommodates the gas generator 185 in an end face of the piston portion 153 which faces a bottom wall portion 127 of the cylinder (the accommodation-side portion) 122. The piston rod (the push-side portion) 152 includes an opposite wall portion 158 which makes up a ceiling surface 157a of the accommodation recess portion 157 and faces oppositely the gas generator 185, and a slidable cylindrical portion 159 which extends from an outer circumferential edge of the opposite wall portion 158 to the bottom wall portion 127 of the cylinder 122 while covering the circumference of the gas generator 185 and which makes up an inner circumferential surface 157b of the accommodation recess portion 157 while made to slide on the inner circumferential surface 126a of the cylinder (the accommodation-side portion) 122 on an outer circumferential surface thereof.

Similar to the gas generator 70 of the first embodiment, the gas generator 185 uses a squib or a micro gas generator which ignites predetermined gunpowder, not shown, to thereby generate operation gas G by means of combustion of the gunpowder itself or combustion of a gas generating agent which is ignited by the gunpowder when actuated. A connector 185b is provided at a proximal portion side lies away from a distal end 185a from which the operation gas G is discharged and which projects from the bottom wall portion 127, lead wires, not shown, through which an ignition electrical signal (an operation signal) is inputted from a predetermined control circuit are connected to the connector 185b. Similar to the gas generator 70 of the first embodiment, when an ignition signal is inputted into the gas generator 185 from the control circuit, not shown, in the gas generator 185, a gun powder incorporated in the gas generator 185 is ignited for combustion, and further, a gas generating agent is also caused to burn as required to thereby generate combustion gas, and the combustion gas so generated is discharged from the distal end 185a to be supplied to the accommodation recess portion 157 in the piston portion 153 as operation gas G.

In this actuator 121 of the second embodiment, too, when the gas generator 185 generates the operation gas G, the piston rod 152 as the push-side portion advances to extend relative to the cylinder 122 as the accommodation-side portion, causing the connecting portions 14c, 15a with the hinge arm 14 and the mounting plate 15 to move away from each other (refer to FIGS. 2, 3). This increases an intersection angle θ0 between the hinge arm 14 and the mounting plate 15, whereby a hood panel 10 is raised at a rear end 10c without being raised at a front end 10f which is locked by a latch 8b.

In the cylinder 122 as the accommodation-side portion, a cap material which makes up the ceiling portion 123 is crimped to a metallic cylindrical pipe material, and the proximal portion side of the cylinder 122 is also crimped to form the bottom wall 127 side. A locking step portion (an annular groove) 130 for locking a lock ring 180 which makes up a reverse preventing lock mechanism BR is formed on an inner circumferential side of the circumferential wall portion 126 near the ceiling wall portion 123. The locking step portion 130 includes an outer circumferential restricting surface 132 which restricts the diametrical expansion of the lock ring 180 as a bottom surface of the annular groove and a locking restricting surface 131 which extends from an edge of the outer circumferential restricting surface 132 at a reverse side of the piston rod 152 towards an axis C of the actuator 121 to lock the lock ring 180.

When in actuation, the ceiling wall portion 123 is brought into abutment with the piston portion 153 of the piston rod 152 to thereby constitute a stopper which restricts a maximum operation stroke of the actuator 121.

Further, in the cylinder 122, a connecting portion 129 is secured to an outer circumferential surface of the bottom wall portion 127 for connection to a connecting portion (an accommodation-side connecting portion) 14c of the hinge arm 14. A connecting hole portion 129a is provided in the connecting portion 129 for insertion of a pivot device 18. Then, the connecting portion 129 is connected rotatably to the connecting portion 14c of the hinge arm 14 by making use of the pivot device 18 which is connected rotatably to the connecting portion 14c.

The piston rod 152 as the push-side portion includes an accommodation groove 162 which accommodates the lock ring 180 and a recessed groove portion 160 in which a seal material 170 is fitted in which are provided on an outer circumferential surface of the piston portion 153 sequentially in that order from an advancing side. The seal material 170 is made up of an O ring and slides on an inner circumferential surface 126a of the circumferential wall portion 126 of the cylinder 122 while ensuring the gas seal properties when the piston portion 153 advances.

The accommodation groove 162 accommodates the lock ring 180 and includes a tapered restricting surface 163 which expands diametrically from an advancing side edge of a bottom surface 164 and a step surface 165 which extends towards an axis C from a reverse side edge of the bottom surface 164. The tapered restricting surface 163 is an inclined surface which expands diametrically from the bottom surface 164 to the advancing side (an upper side in FIGS. 10, 11) and is inclined at an inclination angle of 45° with respect to the axis C.

The lock ring 180 makes up the reverse preventing lock mechanism BR which restricts the reverse of the piston rod 152 after the actuator 121 has completed its operation. The lock ring 180 is made up of a C ring of spring steel which has a circular cross section and which can elastically be deformed. The lock ring 180 is accommodated in the accommodation groove 162 while being narrowed diametrically as a result of the contact with the inner circumferential surface 126a of the cylinder 122 or while being allowed to expand. Then, when the piston rod 152 has advanced completely, the lock ring 180 expands diametrically and is accommodated in the locking step portion 130 of the cylinder 122. The lock ring 180 is set so that a cross-sectional diametric dimension is larger than a width dimension of the locking restricting surface 131 of the locking step portion 130 (a width dimension between the outer circumferential restricting surface 132 and the inner circumferential surface 126a) and a dimension half the diametric dimension (a radial dimension) is substantially equal to or slightly smaller than the width dimension of the locking restricting surface 131.

Namely, the diametric dimension of the lock ring 180 is set larger than the width dimension of the locking restricting surface 131 so that when the lock ring 180 is accommodated in the locking step portion 130, the lock ring 180 strikes the outer circumferential restricting surface 132 of the locking step portion 130 to thereby project from the inner circumferential surface 126a of the cylinder 122. In addition, the radial dimension of the lock ring is set substantially equal to or slightly smaller than the width dimension of the locking restricting surface 131 so that when the lock ring 180 is accommodated in the locking step portion 130 and the piston rod 152 attempts to reverse after its advancement has completed, even though the tapered restricting surface 163 of the piston rod 152 strikes the lock ring 180 accommodated in the locking step portion 130, the lock ring 180 strikes the locking restricting surface 131 to thereby be locked in such a way that the lock ring 180 is not dislocated from the locking restricting surface 131.

Because of this, even though the piston rod 152 attempts to reverse after its advancement has completed, in the lock position RP of the piston rod 152, the tapered restricting surface 163 of the piston rod 152 strikes an inner circumferential portion 180a of the lock ring 180 which is accommodated in the locking step portion 130, and an outer circumferential portion 180b of the lock ring 180 is locked so as not to be dislocated from the locking restricting surface 131. Thus, the reverse of the piston rod 152 is prevented. Consequently, in the case of the second embodiment, the reverse preventing lock mechanism BR which prevents the reverse of the piston rod 152 after its advancement has completed is made up of the locking step portion 130 including the locking restricting surface 131 and the outer circumferential restricting surface 132 on the cylinder 122, the lock ring (the reverse restricting member) 180 which is accommodated in the accommodation groove 162 while being biased in the direction in which the piston rod 152 expands diametrically, and the tapered restricting surface 163 of the accommodation groove 162 of the piston rod 152.

A connecting portion 156a is provided at an end side of the rod portion 155 of the piston rod 152 which constitutes a distal end side when the piston rod 152 advances. This connecting portion 156 has a connecting hole portion 156a, which is a circular hole, and is connected to the mounting plate 15. This connecting portion 156 is connected rotatably to the connecting portion 15a of the mounting plate 15 by making use of a pivot device (a pivot pin) 19 which is inserted through the connecting hole portion 156a (refer to FIG. 2). The pivot device 19 passes through the connecting hole portion 156a and is connected rotatably to the connecting portion 15a of the mounting plate 15.

In addition, a seal material 191 which doubles as an adhesive is filled to be set in a gap (a seal portion on an outer circumferential surface of the actuator 121) 189 which is defined between an end edge outer circumferential surface 156b at a lower end of the connecting portion 156 and an end edge inner circumferential surface 126b on the circumferential wall portion 126 of the cylinder 122 at the advancing side. This seal material 191 joins the piston rod (the push-side portion) 152 and the cylinder (the accommodation-side portion) 122 together while ensuring the waterproofness of the interior of the cylinder before the actuation of the actuator 121. This seal material 191 is provided by pouring or injecting a hot melt adhesive (a filler) 80 similar to the seal materials 81, 82 of the first embodiment and setting it through molding.

Similar to the first embodiment, the joining force between the piston rod 152 and the cylinder 122 at the seal material 191 can resist sufficiently a moment applied when the hood panel 10 is opened and closed in the normal use by which the connecting portions 14c, 15a of the hinge arm 14 and the mounting plate 15 are caused to move away from each other and is set so that the connecting portion 156 of the piston rod 152 can be dislocated from the circumferential wall portion 126 of the cylinder 122, that is, so that the piston rod 152 can advance when the gas generator 185 is actuated to operate.

In the second embodiment, too, lead wires from a control circuit, not shown, are connected to the connector 185b of the gas generator 185 in the actuator 121, and the connecting portions 129, 156 are connected to the connecting portions (the connecting locations) 14c, 15a of the hinge arm 14 and the mounting plate 15 in the left and right hinge mechanisms 11 of the hood panel 10 by making use of the pivot devices 18, 19, whereby the actuator 121 can be provided in the hinge mechanism 11, and the pop-up apparatus U can be mounted on the vehicle V (refer to FIGS. 1, 2).

Figure 10:
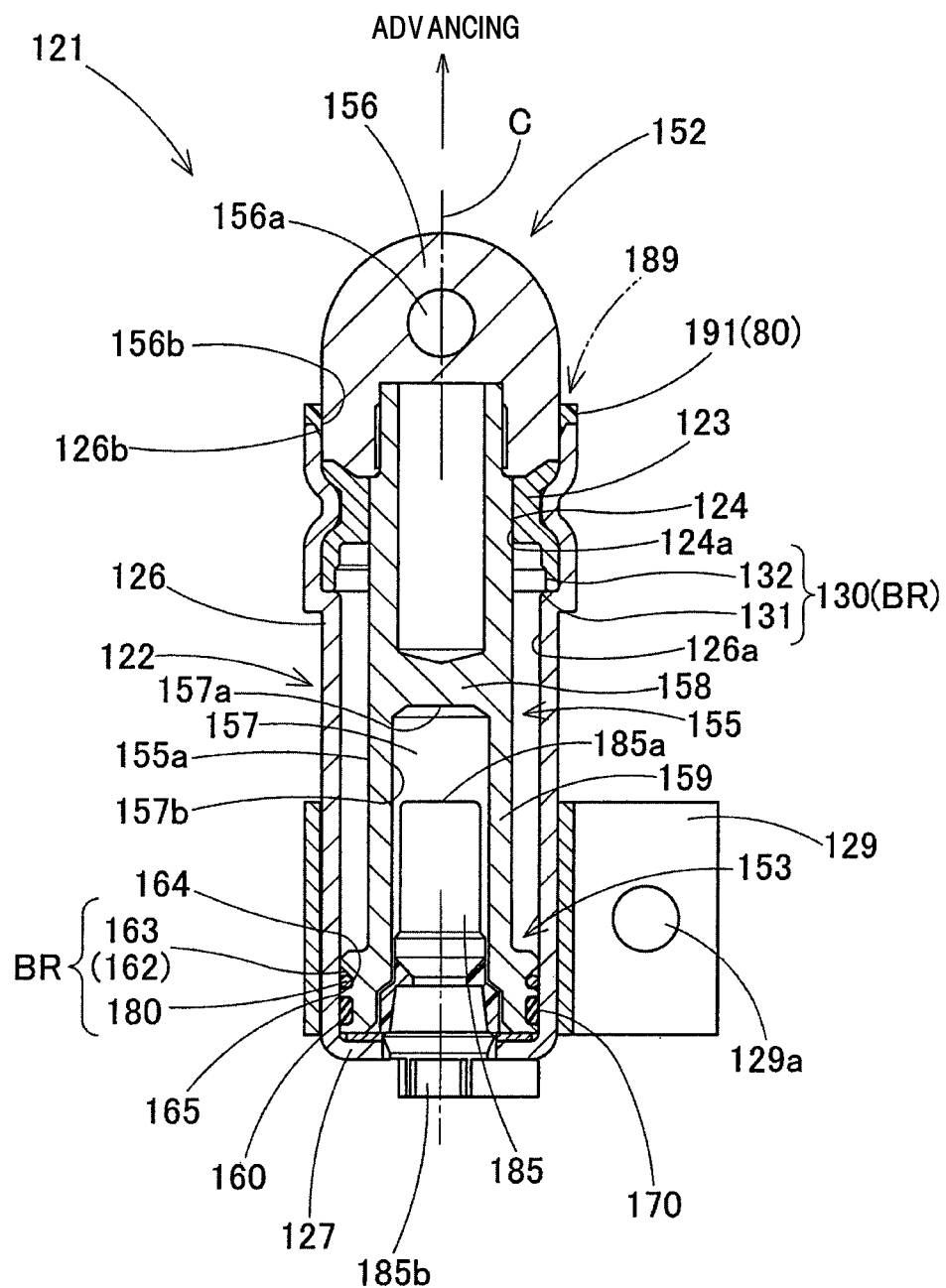
FIG. 10 is a vertical sectional view of an actuator of a second embodiment.
Figure 11:
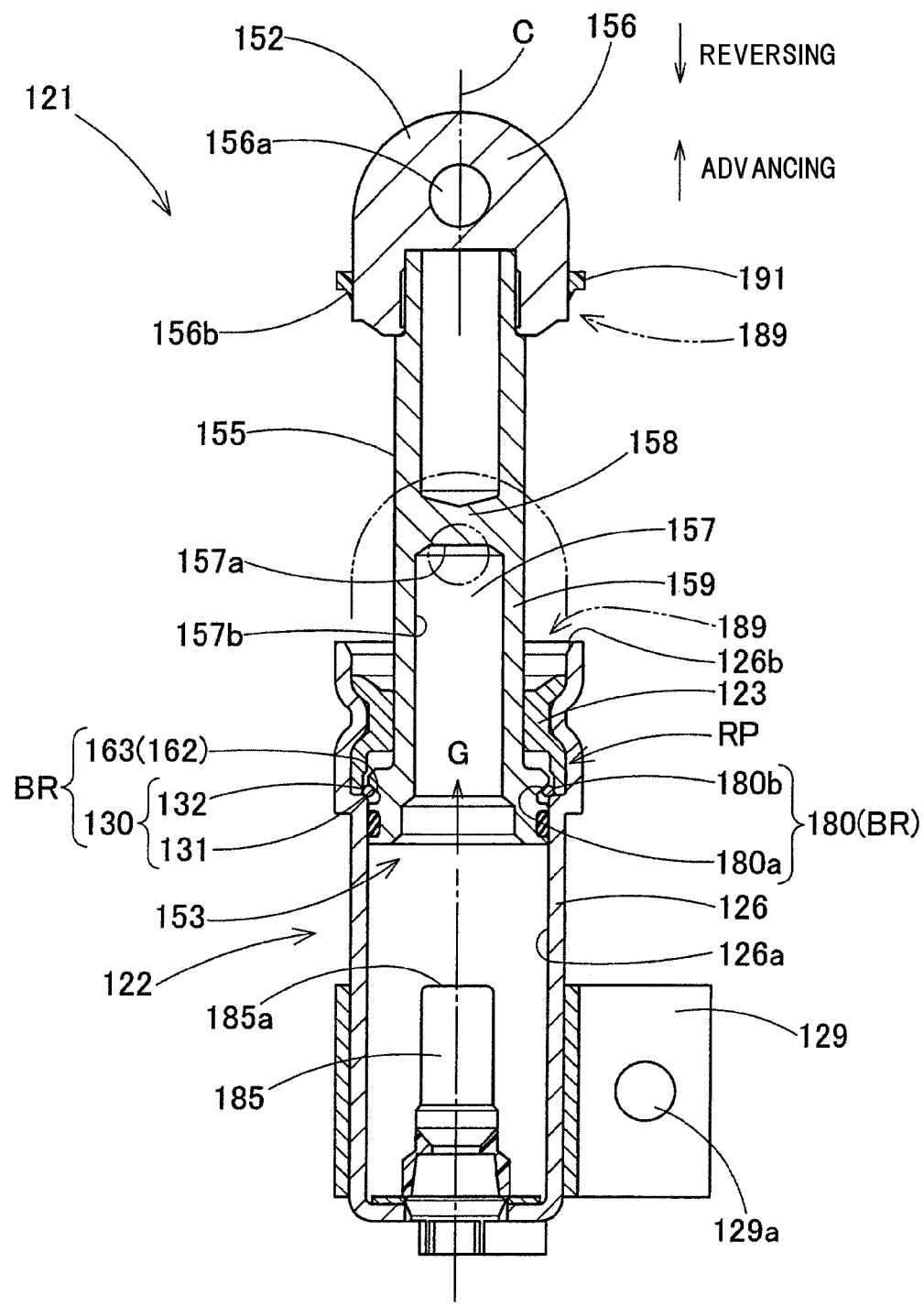
FIG. 11 is a vertical sectional view showing the actuator of the second embodiment when in actuation.

In the pop-up apparatus U of the second embodiment which is mounted on the vehicle V, in the event that the actuator 121 is actuated to operate, the operation gas G is generated by the gas generator 185, the seal material 191 is separated from the end edge inner circumferential surface 126b of the cylinder 122 as shown in FIGS. 10, 11 by means of a pressure of the operation gas G, and the rod portion 155 of the piston rod 152 as the push-side portion 152 of the actuator 121 is caused to project from the cylinder 122, whereby the actuator 121 is allowed to extend. Then, similar to the first embodiment, the actuator 121 which is extending widens the intersection angle θ0 between the mounting plate 15 and the hinge plate 14, which raises the hood panel 10 at a rear end 10c thereof (refer to FIGS. 2, 3), whereby the hood panel 10 can ensure a wide deformation space S so that the hood panel 10 can be deformed largely and can receive a pedestrian while mitigating an impact.

In the actuator 121 of the second embodiment, too, the same working effect as that of the first embodiment can be obtained.

In the second embodiment, the gas generator 185 includes the connector 185b having the seal properties, and although no seal member which is set after being poured is not provided on the circumference of the connector 185b, in case it is necessary, such a seal material may be provided separately.

In addition, in the second embodiment, too, while the connecting portion 129 of the cylinder 122 as the accommodation-side portion of the actuator 121 is described as being connected to the hinge arm 14, and the connecting portion 156 of the piston rod 152 as the push-side portion is described as being connected to the mounting plate 15, an opposite configuration may be adopted in which the connecting portion 129 of the cylinder 122 is connected to the connecting portion 15a of the mounting plate 15 and the connecting portion 156 of the piston rod 152 is connected to the connecting portion 14c of the hinge arm 14.

Further, in the first and second embodiments, the accommodation-side portion 22, 122 and the push-side portion 52, 152 are described as being connected to the accommodation-side connecting portion 14c and the push-side connecting portion 15a by being provided the predetermined connecting portions 25, 129 before actuation. However, a configuration may be adopted in which at least either of the accommodation-side portion 22, 122 and the push-side portion 52, 152 is fixedly connected to a fixed side connecting portion (a fixed-side connecting location), while the other of the accommodation-side portion 22, 122 and the push-side portion 52, 152 is provided to be spaced apart from a movable-side connecting portion (a connecting location) which is spaced apart from the fixed-side connecting portion before actuation, and when actuated, the other of the accommodation-side portion 22, 122 and the push-side portion 52, 152 is brought into contact with (joined, connected to) the movable-side connecting portion so as to support or move the movable-side connecting portion. In this configuration, since the lead wires 70c need to be provided to input the ignition signal (the operation signal) to the gas generator 70, 185, when considering the routing of the lead wires 70c or the space needed to deal with the movement of the lead wires 70c, it is desirable to adopt a configuration in which the accommodation-side connecting portion of the accommodation-side portion 22, 122 constitutes the fixed-side connecting portion, while the push-side connecting portion of the push-side portion 52, 152 constitutes the movable-side connecting portion, and the push-side portion 52, 152 is provided to be spaced apart from the movable-side connecting portion in such a way as to be brought into contact with (joined, connected to) the movable-side connecting portion when actuated.

Furthermore, in the first and second embodiments, while the actuator 21, 121 is described as being applied to the pop-up apparatus U for popping up the hood panel 10, the actuator may be applied to an actuator for a head protection apparatus in which a headrest is divided into two front and rear portions, so that a front headrest portion is made to advance when the vehicle is involved in a collision or a knee protection apparatus in which an accommodation-side portion and push-side portion are connected to a knee panel in front of the seated driver and a body-side reinforcement, so that the knee panel is moved to the rear when the vehicle is involved in a frontal collision. Further, the actuator of the invention is not limited to those of the embodiments, as long as the gas generator is actuated to operate so that the push-side portion is moved relative to the accommodation-side portion and hence can be applied to various types of automotive safety apparatuses.

What is claimed is:

1. An actuator comprising:
    a gas generator which generates an operation gas when actuated;
    an accommodation-side portion which accommodates and holds the gas generator; and
    a push-side portion which is pushed by the operation gas generated from the gas generator to advance relatively so as to move away from the accommodation-side portion, wherein:
    a first seal material, which realizes watertightness between the push-side portion and the accommodation-side portion before actuation, is provided in an external surface side portion between the push-side portion and the accommodation-side portion by being poured and set through molding;
    the first seal material doubles as an adhesive, which enables the push-side portion to move relatively when actuated, and which provides a joining force with which the push-side portion can be restricted from moving relatively before actuation so as to join the push-side portion and the accommodation-side portion together;

the accommodation-side portion includes an input member for inputting an operation signal for the gas generator, the input member projecting from the accommodation-side portion to an exterior portion; and a second seal material formed from the same material as that of the first seal material is provided by being poured and set in the portion of the accommodation-side portion where the input member projects.

2. An actuator comprising:

a gas generator which generates an operation gas when actuated;

an accommodation-side portion which accommodates and holds the gas generator; and a push-side portion which is pushed by the operation gas generated from the gas generator to advance relatively so as to move away from the accommodation-side portion, wherein:

a seal material realizes watertightness between the push-side portion and the accommodation-side portion before actuation;

the seal material is filled in a gap which is opened on the moving side of the push-side portion and which is opened between an external surface side portion between the push-side portion and the accommodation-side portion by being poured; and the seal material doubles as an adhesive which enables the push-side portion to move relatively when actuated and which provides a joining force with which the push-side portion can be restricted from moving relatively before actuation so as to join the push-side portion and the accommodation-side portion together.

3. The actuator according to claim 1, wherein:

the first seal material is filled in a gap which is opened on the reverse side of the push-side portion and which is opened between an inner circumferential side of the end edge of the push-side portion and an outer circumferential side of the proximal portion of the accommodation-side portion by being poured.

4. The actuator according to claim 2, wherein:

the gap is opened on the reverse side of the push-side portion and is opened between an inner circumferential side of the end edge of the push-side portion and an outer circumferential side of the proximal portion of the accommodation-side portion.

\* \* \* \* \*